Patented Sept. 11, 1945

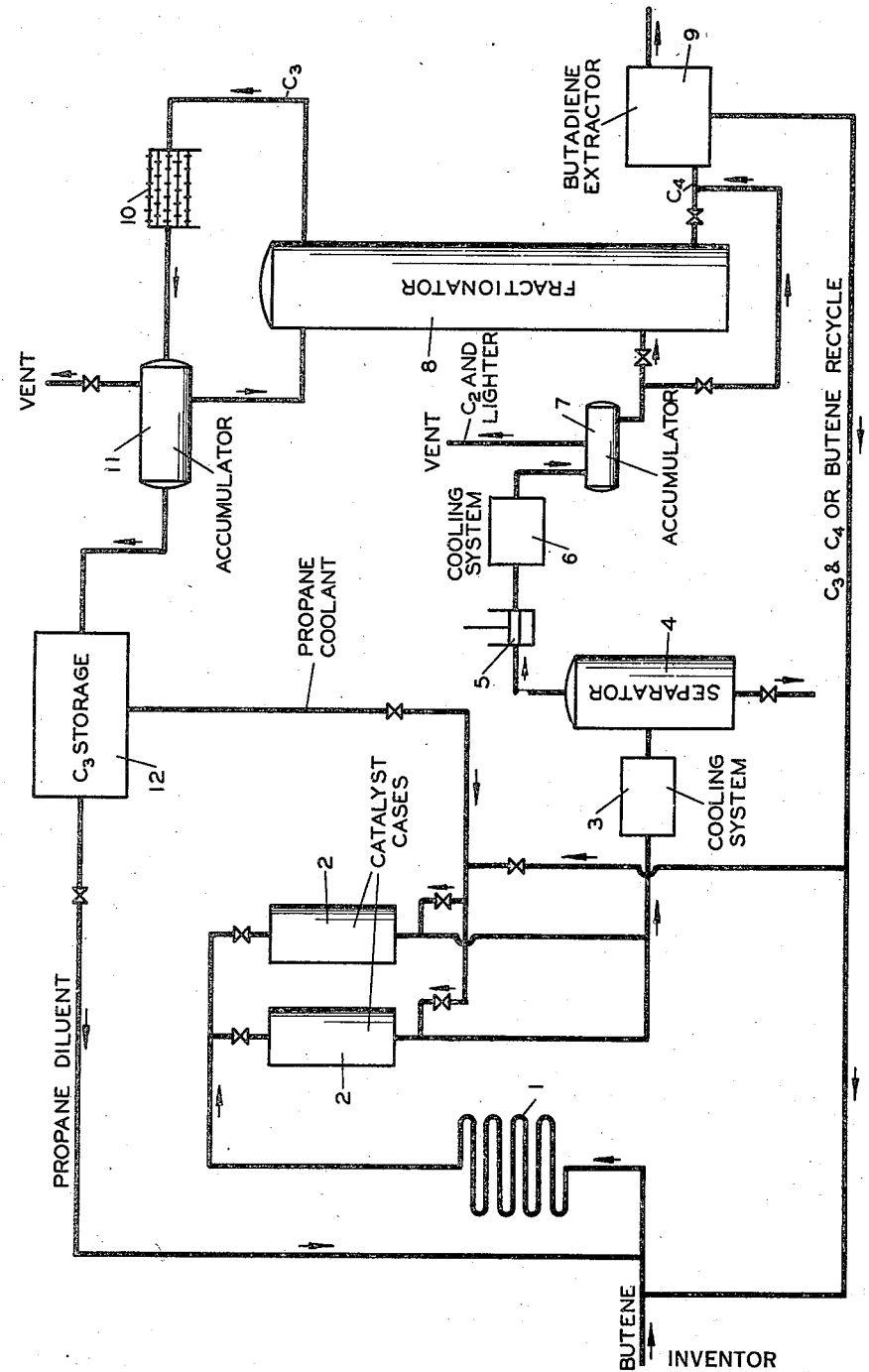

2,384,645

UNITED STATES PATENT OFFICE 2,384,645

PROCESS FOR DEHYDROGENATING HYDROCARBONS

Walter A. Schulse, Bartlesville, Okla., assignor to Phillips Petroleum Company, a corporation of Delaware Application August 24, 1940, Serial No. 354,085

6 Claims. (Cl. 260—680)

This invention relates to the dehydrogenation of hydrocarbons and particularly to improved catalytic methods of dehydrogenating olefinic hydrocarbons to produce the corresponding diolefins.

In a more specific sense the invention is concerned with a new and improved process for controllably increasing the degree of unsaturation in hydrocarbons of the character mentioned while reducing greatly the loss of valuable raw materials and products due to polymerization and decomposition reactions which normally occur at a rapid rate in the effluents from the catalytic treatment.

In the production of butadiene, for example, by the catalytic dehydrogenation of butenes, serious losses may occur because of decomposition reactions. When this treatment is carried out at atmospheric pressures, large quantities of light gases are produced, coke is deposited on the catalyst in quantities sufficient to plug the catalyst tubes, and considerable liquid polymer is formed. The recovery of diolefin under these conditions is very small, and operating difficulties often result in exceedingly brief operating periods.

It is possible to suppress these undesirable side reactions to a large extent by operating the dehydrogenation with partial pressures of butenes in the range of 0.1 to 0.5 atmospheres through the use of inert diluents. Under these conditions, polymerization and cracking of both olefins and diolefins within the catalyst space is reduced sufficiently so that in many cases the process may be operable.

It is also possible to suppress decomposition and polymerization reactions by special treatment of the catalyst to reduce the promotion of side reactions. By this means the dehydrogenation of butenes may be carried out with a minimum of cracking and polymer formation within the catalyst space.

However, even in these above-described improved processes wherein side reactions are minimized during the period of actual contact of hydrocarbons with the catalyst, considerable loss of olefins and diolefins occurs due to the formation of liquid polymer after the effluents emerge from the catalyst bed. The vapors leaving the catalyst at temperatures of 1100 to 1300° F. may contain only traces of polymer, but rather high percentages of high-boiling polymers are found in the dehydrogenated vapors after cooling to temperatures in the range of 150-300° F. The polymerization reactions involved may be illustrated, using general formulas, as follows:

At high temperatures of the order of 1000° F. equilibrium is established in extremely short times, but the concentrations of dimer and higher polymer at equilibrium are very small. At low temperatures of the order of 200°-300° F., the equilibrium is established so slowly that little dimer is normally formed even though equilibrium concentrations allow the formation of high percentages. At intermediate temperatures, however, both the time required to establish equilibrium and the equilibrium concentrations are favorable to dimer and higher polymer formation.

For example, at temperatures around 1200° F. the quantity of dimer formed at equilibrium from butenes is less than one per cent, but this quantity increases to about 5 per cent at temperatures near 700° F. Butadiene is even more readily polymerized, and at temperatures of 700-1000° F. a very considerable quantity of the diolefin may exist in the dimeric form at equilibrium. Copolymers formed between butenes and butadiene are also more readily formed than butene polymers, and may account for a further amount of polymer formation. Thus I have found that serious losses of butadiene may occur subsequent to the catalytic dehydrogenation step while the effluent vapors are being cooled if sufficient time elapses for equilibrium concentrations of polymers to be attained in the temperature range of rapid polymerization.

The polymerization reaction velocity is enormously greater at temperatures just below the dehydrogenation range than it is at low temperatures such as those finally attained by the cooling system. Consequently, the formation of large amounts of polymer in the cold effluents does not occur in the absence of catalyst, even over very long periods of time. On the other hand, in the range from dehydrogenation temperatures down to about 600–800° F. polymerization reaction rates are still extremely high so that equilibrium concentrations are approached in a few seconds or less. The large quantities of polymer formed even when using improved deactivated catalyst and low partial pressures of butenes are therefore accounted for by equilibrium concentrations of polymers being formed as the gases are brought down through this active temperature range in conventional cooling equipment, wherein the cooling period is relatively long. Below about 600 to 700° F. the reaction velocity of polymerization becomes too small to cause measurable losses, even when the cooling period is prolonged.

I have noted that when carrying out the dehydrogenation of butenes quantities of polymer varying from about two to about ten per cent of the butene charge are often formed while conversion to butadiene is only of the order of about fourteen to twenty four per cent. Thus, the loss of diolefin due to polymerization which may largely occur after the effluent vapors leave the catalyst may be seen to be very serious.

I have now found that the quantity of butadiene converted to liquid polymers and tar may be very greatly reduced and the yield of butadiene markedly increased if the hot effluent vapors be cooled immediately on their emergence from the catalyst by injection of considerable proportions of cold liquid hydrocarbons so that the temperature of the stream is almost instantly reduced to such a temperature that the rate of polymerization is low. I have found that it is possible by this procedure to pass through that temperature range where the rate of polymerization is high and the quantity of polymer at equilibrium is appreciable in such a short time that essentially no further polymerization takes place after the effluent vapors leave the catalyst. Thus I am able to "freeze" the vapor composition at the equilibrium point existing at the reaction temperature, a point where ordinarily less than one per cent of the unsaturates has been polymerized. The losses are thus kept at the minimum point and the yields of diolefin correspond to the percentage of butenes converted thereto.

For the purpose of this very rapid direct quenching I prefer to employ liquid propane, although in some cases other hydrocarbons may be used. It is necessary to separate the quench material subsequently, and the problem of separation limits the choice as well as do the factors of heat stability and of thermal properties.

The process according to the invention may be more readily understood with reference to the accompanying drawing, which represents schematically one form of apparatus in which it may be carried out. In the figure, 1 is a heater into which the butenes diluted with propane are first led and vaporized. Leaving the heater, the heated vapor enters catalyst chamber 2, where it contacts a suitable dehydrogenation catalyst. The temperature of the bottom section of the catalyst bed is maintained near that of the top section. Immediately below the catalyst cases or below the catalyst sections in the cases, liquid propane is injected into the stream. This combined partially cooled vapor stream then passes to cooling system 3, composed of suitable combinations of condensers, heat exchangers and the like where cooling is complete, and any liquid polymer is separated in polymer separator 4. The vapors then enter compression unit 5, and after compression pass to coolers 6 and accumulator 7. Light gases are removed from the accumulator 7 while the liquid hydrocarbons pass to fractionating column 8. Propane is removed overhead through condenser 10 and accumulator 11, from which part of the condensate is returned as reflux to the column. The excess condensate passes to propane storage 12. Part of the propane from 12 is recycled as a diluent gas in the dehydrogenation step, and part is available for further use as a cooling agent. The $C_4$ hydrocarbons from the fractionator kettle pass to butadiene separator 9 in which butadiene is separated from the mixed butenes and sent to storage. The butenes are recycled for further treatment.

An optional method of operation according to the figure eliminates the separation of $C_3$ and $C_4$ hydrocarbons in fractionating column 8. The butene charge diluted with propane passes through heater 1 and catalyst chamber 2 as in the previously described operation. The direct quenching is accomplished by injection of required amounts of the recycle liquid from butadiene extractor 9 comprising propane, propylene and butenes. The effluents are further cooled in exchanger 3 and pass through polymer separator 4, compressor 5 and condenser 6 into accumulator 7. Sufficient cooling and/or refrigeration is applied in 6 to make possible a satisfactory separation of $C_2$ hydrocarbons and lighter material as gases from the $C_3$ and $C_4$ hydrocarbon liquid in 7, with only small losses to $C_3$ hydrocarbons. The cooled liquid then passes direct to butadiene separator 9 wherein the butadiene is extracted and the remaining $C_3$ and $C_4$ material is returned, partly to the fresh feed line as recycle and partly to the quench injection lines. Sufficient fresh butene charge is added to the recycle material to maintain the desired partial pressure in the charge to the catalyst, and sufficient propane diluent is added to compensate for any propane converted or lost in the process.

In operating my process for the production of butadiene, either of the normal butenes or any convenient or available mixture of them may be used as charge stock with satisfactory results. In many cases dehydrogenation of the olefin will follow as the second stage to a similar dehydrogenation step applied to butane. The mixed butenes derived from cracking still gases or other sources are also satisfactory charges if substantially free of heavy material.

The temperature of the catalytic treatment will depend somewhat upon the catalyst selected, but temperatures within the range of 1100 to 1400° F. are usually necessary to achieve satisfactory conversions to diolefins. With active catalysts flow rates of 1 to 10 liquid volumes of charge per hour per volume of catalyst are ordinarily satisfactory, although higher rates may be used.

It is necessary to maintain the partial pressure of butene below atmospheric, ordinarily in the range of 0.1 to 0.50 atmosphere. This may be accomplished by vacuum operation, if desired, but is most readily accomplished by dilution with an inert gas. In this way atmospheric or slightly higher pressure may be maintained through the treating system. In some cases the use of pressures considerably above atmospheric, up to two or three hundred pounds gage, may be advantageous in processing the effluent vapors.

Diluent gases which may ordinarily be employed for the dehydrogenation step comprise the hydrocarbons more refractory than butenes, particularly propane and other inert gases, especially carbon dioxide and nitrogen. The choice of diluent is considerably affected in my new process by the injection of a hydrocarbon gas for rapid cooling of the effluents subsequent to treatment. Preferably the same gas is used for both purposes thereby greatly simplifying the subsequent separation steps and recycling arrangements. I prefer to use propane, or more generally, at least a fairly close cut $C_3$ fraction comprising propane and/or propylene for this purpose. The propane and/or propylene may be obtained from any desired source.

The catalyst employed may be selected from those of suitable dehydrogenating activity. Particularly suitable is a specially treated bauxite catalyst in which deactivation toward polymerization and cracking reactions has been effected by chemical treatment. I find that any polymer formed within the catalyst space may be readily cracked to give a carbon deposit and large volumes of hydrogen and light gases at the high temperature of operation. Although the quantity of polymer which can be present is fixed at a small value by equilibrium conditions at dehydrogenating temperatures maintenance of this equilibrium value may lead to a serious loss if butene charged was injected into the stream at the bottom of the catalyst cases. The gases were cooled to 700° F. at this point, with a net increase of 11% in volume. The partially cooled vapors passed through further cooling equipment to drop the temperature from 700° F. to 100° F. About 0.4 to 0.5 per cent polymer was separated in the polymer separator during the final cooling. After fractionation and separation of butadiene, 21% of the volume of butene charged was obtained as butadiene, and sixty per cent of butenes was recovered unchanged, and recycled.

A test conducted under identical conditions but without injection of liquid propane for cooling yielded only 17 per cent of the butene as butadiene, while liquid polymer separated reached 4 per cent.

While my process has been described specifically in connection with the production of butadiene from butenes, I have found that it is of generally wide scope and satisfactory application to the dehydrogenation of other hydrocarbons of the character mentioned to controllably increase the unsaturation without altering the carbon atom structure of the hydrocarbon molecules.

I claim:

1. A process for the production of butadiene which comprises catalytically dehydrogenating butenes admixed with $C_3$ hydrocarbons to produce a partial pressure of butenes below 0.5 atmosphere at temperatures between 1000 and 1300° F. so that a considerable proportion of the butenes is converted to butadiene, injecting into the effluent vapors adjacent the point of exit from the catalyst space sufficient recycle liquid comprising $C_3$ and $C_4$ hydrocarbons to reduce the temperature thereof below the range of rapid diolefin polymerization, compressing and condensing the effluents with separation of light gases lower-boiling than $C_3$ hydrocarbons therefrom, processing the cooled condensate to remove butadiene and recycling the substantially diolefin-free liquid by a divided stream partly to the fresh feed stream ahead of the catalyst and partly to the point of injection into the effluents from the catalyst.

2. In a process for the production of butadiene by the catalytic dehydrogenation of butenes which comprises passing said butenes admixed with a major proportion of a $C_3$ hydrocarbon diluent in contact with a dehydrogenating catalyst at temperatures between 1000 and 1300° F. so that a considerable proportion of the butenes is converted to butadiene, cooling and condensing the effluents to separate light gases from the $C_3$—$C_4$ condensate, processing said condensate to extract butadiene therefrom and recycling the substantially butadiene-free liquid to the catalytic treatment, the step of injecting into the hot effluents from the catalyst space sufficient of the recycle $C_3$—$C_4$ liquid to reduce the vapor temperature below the range of rapid diolefin polymerization, thereby suppressing polymerization of the unsaturated components of the effluent vapor during the cooling period and increasing the process yields of butadiene.

3. A process for the production of butadiene which comprises catalytically dehydrogenating butenes diluted with $C_3$ hydrocarbons to produce a partial pressure of butenes in the range of 0.1 to 0.5 atmosphere at temperatures between 1000° and 1300° F., injecting into the hot effluent vapors adjacent the point of exit from the catalyst space sufficient liquid propane to reduce the vapor stream temperature below about 750° F., compressing and condensing the effluents with separation of light gases, fractionating the condensate to produce a $C_3$ hydrocarbon overhead fraction which is returned for use as diluent and coolant and a $C_4$ hydrocarbon bottoms fraction, processing the said $C_4$ hydrocarbon fraction to extract butadiene therefrom, and finally recycling the unconverted butenes along with fresh butene feed to the catalyst.

4. A process for the production of butadiene which comprises catalytically dehydrogenating butenes diluted with $C_3$ hydrocarbons to produce a partial pressure of butenes in the range of 0.1 to 0.5 atmosphere at temperatures between 1000° and 1300° F. and pressures of zero to 50 pounds gage, injecting into the hot effluent vapors adjacent the point of exit from the catalyst space sufficient recycle liquid comprising $C_3$ and $C_4$ hydrocarbons to reduce the vapor stream temperature below about 750° F., compressing and condensing the effluents with separation of material lower-boiling than $C_3$ hydrocarbons therefrom, processing the condensate to extract butadiene and finally recycling the substantially diolefin-free liquid by a divided stream partly to the fresh feed stream ahead of the catalyst, and partly to the point of injection into the effluent from the catalyst.

5. A process for the production of butadiene which comprises catalytically dehydrogenating butenes admixed with propane to produce a partial pressure of butenes in the range of 0.1 to 0.5 atmosphere with a total pressure only moderately in excess of atmospheric to convert a considerable proportion of the butenes to butadiene, injecting into the effluent vapors adjacent the point of exit from the catalyst space sufficient liquid propane to reduce the temperature below the range of rapid diolefin polymerization, compressing and condensing the effluents with separation of light gases, fractionating the condensate to remove $C_3$ hydrocarbons overhead and a $C_4$ hydrocarbon bottom fraction, recycling propane from the $C_3$ overhead fraction to the dehydrogenation for admixture with the butene as diluent and for injection into the effluent as coolant, separating butadiene from the $C_4$ hydrocarbon bottoms fraction, and finally recycling the unconverted butenes to the catalytic treatment.

6. A process for the production of a straight chain diolefin by dehydrogenation of the corresponding olefin which comprises forming a mixture of the olefins with a $C_3$ hydrocarbon diluent comprising propane to produce a partial pressure of said olefin in the range of 0.1 to 0.5 atmosphere with a total pressure in the range of atmospheric to 50 pounds per square inch gage, subjecting the mixture to conditions of dehydrogenation under which at least a portion of the olefin is converted into the corresponding diolefin, injecting into the effluent of the dehydrogenation immediately following dehydrogenation an additional quantity of said hydrocarbon diluent in liquid phase sufficient to reduce the temperature of the effluents below the range of rapid diolefin polymerization, recovering the diolefins from the cooled effluent, and recycling diolefin-free effluent containing the hydrocarbon diluent to the dehydrogenation for admixture with the olefins and for cooling of the effluent of the dehydrogenation.

WALTER A. SCHULZE.

a catalyst with active cracking properties is employed and the advantage of the subsequent direct quenching may thus be partially nullified.

The catalyst chambers may be of various sizes and designs, as will be evident to those skilled in the art, but should be so constructed and operated that no portion of catalyst is in a zone in which the temperature is below the range used for conversion. If the temperature of the vapors is allowed to drop substantially while in contact with catalyst, polymerization may take place at an extremely rapid rate before my quenching step can be applied.

It will be noted that all the foregoing conditions under which the dehydrogenation process are preferably operated are so selected as to minimize the formation and subsequent decomposition of polymer in the catalyst space and to give a maximum yield of butadiene and recovery of unconverted butenes at the point of emergence from the catalyst space.

For carrying out the very rapid quenching step I prefer to employ liquid propane or propylene or mixtures thereof, or the $C_3$—$C_4$ material remaining after the extraction of butadiene when only ethane and lighter material is removed from the effluents from the catalyst. Propane is extremely satisfactory since a column for depropanizing the effluent stream is ordinarily provided to separate the propane diluent. Thus, the separation of additional propane presents no further problems. Propane may readily be liquefied and pumped, and expands to a gas with absorption of considerable quantities of heat. Ethane is much more troublesome to compress and handle and is therefore not convenient for use except in limited instances. Butane on the other hand, while readily compressed and handled, is not readily separated from the mixed predominately unsaturated $C_4$ hydrocarbons resulting from the dehydrogenation process. Only very small concentrations of butane can be tolerated in the recycle butene stream, and segregation of butane from butenes would require an additional costly processing step. Higher hydrocarbons of five or more carbon atoms are not ordinarily applicable because of instability at high temperature.

When it is desired to process the total effluent stream to extract butadiene without separating the $C_3$ and $C_4$ hydrocarbons, the recycle stream is entirely satisfactory for my quenching step. The propane, obviously, is suitable and the unsaturated $C_4$ hydrocarbons are not heated to a temperature high enough to initiate polymerization. The utilization of a secondary internal recycle is of particular benefit in that less propane is required from an external supply, and that any propylene formed is largely retained within the system with consequent advantages to the dehydrogenation step. These last-named advantages are derived from the greater heat stability of propylene and the fact that the production of small amounts of hydrogen from propane is suppressed by the retained propylene.

The coolant is best injected into the effluent vapors as near as possible to the point of exit from the catalyst bed without cooling the vapors still in contact with the catalyst. Valves must of course be so constructed as to prevent freezing. In general, conductance of heat from the hot gas stream will prevent this trouble.

Although the increase in vapor volume occasioned by injection of the direct quenching medium is considerable, it is in large part counteracted by the simultaneous contraction of the effluent vapors undergoing cooling. However, vapor lines of sufficient size to avoid increase in pressure must be provided at this point.

The quantity of coolant injected will depend on a number of factors, such as the temperature range through which it is desired to cool the effluents, the degree of conversion attained, the composition of the effluent gas, and other factors.

The temperature to which the effluent must be cooled may ordinarily be chosen in the range 500 to 900° F. but I find that a temperature near 700° F. is ordinarily sufficient and not too difficult to attain. Thus, a drop of about 400° to 500° F. is brought about when dehydrogenating near 1200° F., reducing the velocity of polymerization enormously. This amount of cooling may be ordinarily achieved by injection of coolant in quantities equivalent to and often much less than that of the original effluents. The degree of conversion influences the quantity needed slightly, due to the increase in volume of gases accompanying increased conversion. The latent heat of vaporization of the propane, and/or butenes as well as the generally greater temperature gradient through which it is heated compared with the cooling vapors make the quantity of coolant required generally about one half to two thirds of the volume of the effluent vapors.

The quenching is accomplished almost instantaneously and there is no chance for polymerization to follow the equilibrium curve as the temperature is lowered. Generally, equilibrium concentrations of polymer at 1200° F., ordinarily much less than one per cent, are present in the effluent vapors treated according to the present invention. The polymer concentration is thus fixed at this value during cooling to about 700° F. At this temperature and below polymerization is very much slower. It is thus possible to pass the partially cooled vapors through further heat exchangers, condensers, polymer separators and other equipment of conventional cooling systems, without further appreciable polymer formation regardless of the time required.

The separation of light gases alone or of the light gases and the total quantity of $C_3$ material from the effluents may be carried out on conventional lines, obvious to those skilled in the art. The $C_3$ hydrocarbon stream may be recycled as a diluent in proper volume, the remainder being separated and recycled as coolant. Any excess formed in the dehydrogenation reaction is normally removed from the system.

The butadiene may be separated from the $C_4$ hydrocarbons by extraction with cuprous chloride solution or other chemical or physical separation methods, and the unconverted butenes may be recycled as desired.

The following example will serve to more fully illustrate the results which may be obtained by my invention, although said example is not to be construed as a limitation thereof.

*Example*

Butene-1 produced by the dehydrogenation of butane was diluted with 3 volumes of a propane-propylene fraction and processed in the equipment shown in the figure. The catalyst was calcined 6-14 mesh bauxite treated with 5% barium hydroxide. The gas was treated at 1175° F. and 5 pounds gage pressure. Conversion to butadiene was near 20% and the polymer content of the hot vapor stream leaving the catalyst was less than 0.5 liquid volume per cent. Propane at 90° F. equivalent in gaseous form to 2.75 volumes of the